3,388,136
DIBENZO[b,d]PYRANS AND PROCESS
Edward C. Taylor, 288 Western Way, and Katherine
Lenard, 120 Prospect Ave., both of Princeton, N.J.
08540
No Drawing. Filed Jan. 11, 1966, Ser. No. 519,954
15 Claims. (Cl. 260—345.3)

ABSTRACT OF THE DISCLOSURE

Tetrahydro - 1 - hydroxy - 6,6,9-trimethyl-6H-dibenzo [b,d]-pyrans are prepared by the acid-catalyzed condensation of citral with a resorcinol. The compounds possess analgesic and central nervous system depressant activity.

This invention relates to substituted dibenzo[b,d]-pyrans having potent analgesic activity and to processes for their preparation. In particular, the invention relates to 6a,7,10,10a-tetrahydro-1-hydroxy-6,6,9 - trimethyl-6H-dibenzo[b,d]-pyrans (referred to herein as $\Delta^{8,9}$ compounds); 6a,7,8,10a-tetrahydro-1-hydroxy-6,6,9-trimethyl-6H-dibenzo[b,d]pyrans (referred to herein as $\Delta^{9,10}$ compounds); and to processes for preparing them.

In its process aspect, the present invention comprises a process for preparing compounds of the following structure:

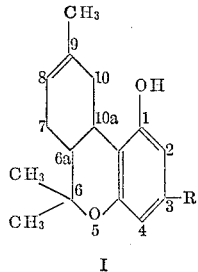

I where R is hydrogen or an alkyl group of up to 12 carbon atoms, and the $\Delta^{9,10}$ double bond isomers thereof. It will be noted that the 6a and 10a-hydrogen atoms in the above formula bear a cis relationship to each other. The process also provides the geometric isomers of these compounds, in which these hydrogen atoms bear a trans relationship to each other. Both the cis and the trans compounds are part of this invention.

The compounds of Formula I have considerable pharmacodynamic activity. They are especially active as analgesics and they also have central nervous system depressant activity. The trans compound where R is n-pentyl and the cyclohexene double bond is at the 8,9 position and the isomeric trans compound with the double bond at the 9,10 position are both natural products, being the principal physiologically active components of hemp. The mixture of these two compounds is known as tetrahydrocannabinol. The inventive process provides a convenient one-step method for the preparation of these natural products. The trans compounds in which R is 1,2-dimethylheptyl are especially active as analgesics. These compounds are within the scope of the product aspect of the invention and are also prepared by the process of the invention.

The inventive process comprises the acid-catalyzed condensation of citral (II) with a resorcinol (III).

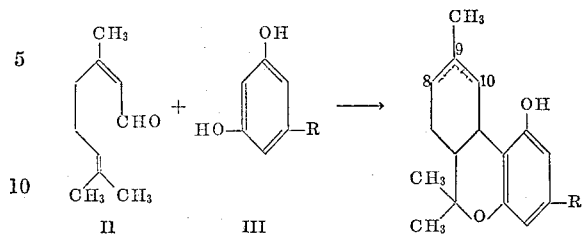

This process makes available either the $\Delta^{8,9}$ or the $\Delta^{9,10}$ compounds, depending upon the conditions used, the principal controlling variable being the strength of the acid catalyst. When a strong acid is used as the catalyst, the product is a mixture of the cis and trans isomers of the $\Delta^{8,9}$ compounds. These isomers are separable by vapor phase chromatography. Among the operative strong acids are mineral acids such as conc. sulfuric acid and conc. hydrochloric acid, and Lewis acids such as boron trifluoride, preferably in the form of the etherate, aluminum chloride, and ferric chloride. When a mild acid is used, the product consists of a mixture of the cis and trans isomers of the $\Delta^{9,10}$ compounds. Among the operative mild acids are dilute hydrochloric, dilute acetic acid, and dilute sulfuric acid.

The condensation is conducted in polar organic solvents such as ethanol and isopropanol, or in nonpolar solvents such as benzene, toluene, xylene, and ethyl acetate. However, choice of solvent is not a critical factor in carrying out the reaction.

The process can be conducted within a temperature range of about 0 to 110°, the consequence of using temperatures higher than room temperature being to cause exclusive formation of the $\Delta^{8,9}$ isomers, regardless of the strength of the acid catalyst employed. Higher temperatures thus override the otherwise controlling effect of acid strength. At temperatures near or below room temperature, the product is either the $\Delta^{8,9}$ or $\Delta^{9,10}$ isomer, the nature of the product being controlled by the strength of the acid catalyst. A temperature range of 0–30° when employed in conjunction with a mild acid catalyst insures the formation of the $\Delta^{9,10}$ isomer. The range 5–10° is most preferred.

The time of the reaction is not critical, 1 to 24 hours being a suitable time.

Commercial citral is a mixture of two geometric isomers. Geranial is the cis compound, i.e., the isomer in which the formyl and methyl groups bear a cis relationship to each other; neral is the trans compound. Either isomer or a mixture thereof, as in citral, is suitable as a reactant in the present process. The term "citral" as used herein is thus intended to signify a mixture of the cis and trans isomers, although either isomer may be used as a starting material.

The resorcinols used as starting materials in the present process are either resorcinol itself (III, R=H) or a 5-alkylresorcinol (III, R=alkyl). The alkyl group may have up to twelve carbon atoms and it may be either branched or straight-chained. Examples of such alkyl groups are methyl, ethyl, propyl, sec-butyl, pentyl, 1,1-dimethylbutyl, 1,2-dimethylbutyl, 1-ethyl-2-methylpropyl, isohexyl, heptyl, 1-methylhexyl, 1,2-dimethylhexyl, 1,2-dimethylheptyl, 1-methyloctyl, and 1-methylnonyl.

The inventive process is practiced in the following manner, being illustrated for the preparation of a $\Delta^{8,9}$ isomer: Citral, a resorcinol, and an acid catalyst such as boron trifluoride-etherate in a solvent such as benzene are stirred with cooling for a period of thirty minutes to about two hours. To insure complete reaction, the reaction mixture is then allowed to stand for a period of several hours, conveniently overnight. The reaction mixture is then worked up by conventional procedures, preferably by addition of water and extraction with an organic solvent such as ether. The crude product is then chromatographed in order to obtain a mixture of the cis and trans products. The cis and trans isomers are separable using vapor phase chromatography.

In its product aspect, the present invention comprises compounds of the following structure:

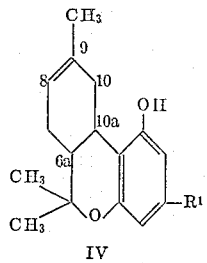

IV where $R^1$ is alkyl of 7 to 12 carbon atoms, the $\Delta^{9,10}$ isomers thereof, and the 6a,10a-trans isomers of these compounds. The inventive compounds of Formula IV are prepared by the procedures described above and are characterized by their potent analgesic activity.

The preferred compound of the invention, 3-(1,2-dimethylheptyl)-6a,7,10,10a-tetrahydro - 1 - hydroxy-6,6,9-trimethyl-6H-dibenzo[b,d]pyran (IV, $R^1=1,2$ - dimethylheptyl), when administered orally to rats in doses of 0.5–25 mg./kg. in the form of a suspension in polyethylene glycol and tragacanth, caused 77–100% analgesia as measured by the standard D'Amour Smith rat tail flick method.

The analgesic compounds of the invention are formulated for use as suspensions or solutions, or in the form of tablets or capsules, by standard techniques known to pharmaceutical chemists.

It will be apparent that if any of the resorcinol starting materials possess asymmetric carbon atoms in the alkyl side chain, this starting material may be either optically active or racemic. If an optically active resorcinol is used, the product compounds will also be optically active. If the starting material is racemic, or a mixture of racemic compounds, the products will be similarly racemic. Racemic compounds are also obtained as a result of the formation of the tricyclic ring system. In view of the fact that resolution of racemic compounds is well known to organic chemists, the invention is intended to comprehend either the racemic or the optically active products.

The following examples illustrate the process and the preparation of the products of the invention, but they are not to be considered as limiting the scope of the invention.

Example 1.—3-(1,2-dimethylheptyl) - 6a,7,10,10a - tetrahydro-1-hydroxy-6,6,9-trimethyl-6H-dibenzo[b,d]pyran To a mixture of 9.4 g. (40 mmoles) of 5-(1,2-dimethylheptyl)resorcinol and 7.0 g. (46 mmoles) of commercial citral in 50 ml. of benzene is added, with stirring and cooling over a 30 minute period, 7.0 g. of boron trifluoride etherate diluted with 15 ml. of benzene. The reaction mixture is stirred for an additional hour and is then allowed to stand at room temperature overnight. It is then diluted with 100 ml. of water and extracted with ether, the ether extracts washed with water, 2 N sodium hydroxide and again with water, dried over anhydrous magnesium sulfate and evaporated. The residual resinous oil (14.2 g.) is then chromatographed on 350 g. of Florisil. Elution of the column with hexane gives a small amount (1.06 g.) of a non-phenolic compound which is discarded. Subsequent elution with hexane-ethyl ether (95:5) then gives a mixture of racemic cis and racemic trans-3-(1,2-dimethylheptyl)-6a,7,10,10a-tetrahydro-1-hydroxy - 6,6,9 - trimethyl-6H-dibenzo[b,d]pyran, separated by vapor phase chromatography (instrument, F and M model 810; column, ¼" x 6' copper, 6% GE–SE 30 on Diatoport S, 100–200 mesh; column temp., 245°; gas, helium; flow rate, 75 ml./min.; inlet temp., 390°; detector temp., 370°; injection, 20 microliters of a 50% hexane solution).

*Analysis.*—Cal'd for $C_{25}H_{38}O_2$: C, 81.03; H, 10.34. Found: C, 81.04; H, 10.31.

Example 2.—6a,7,10,10a-tetrahydro-1-hydroxy-6,6,9-trimethyl-3-pentyl-6H-dibenzo[b,d]pyran To a mixture of 3.60 g. (20 mmoles) of 5-pentyl-resorcinol (olivetol) and 3.60 g. (23.6 mmoles) of commercial citral in 20 ml. of benzene is added with stirring and ice cooling a solution of 2.8 g. of boron trifluoride etherate in 10 ml. of benzene. The reaction mixture is stirred for 1 hour at 5–10° following completion of the addition and is then allowed to stand at 5–10° overnight. Water is added, the mixture extracted with ether, and the ether extracts combined and washed with water, 2 N sodium hydroxide (to remove unreacted olivetol) and again with water, and finally dried over anhydrous magnesium sulfate. Evaporation leaves a residue which is dissolved in hexane and chromatographed using a Florisil column. Elution with hexane gives a first compound, which is not a part of the invention and is discarded. Elution with hexane-ether (95:5) gives a mixture of the racemates of cis and trans-6a,7,10,10a-tetrahydro - 1 - hydroxy-6,6,9-trimethyl-3-pentyl-6H - dibenzo[b,d]pyran, separated by vapor phase chromatography.

*Analysis.*—Cal'd for $C_{21}H_{30}O_2$: C, 80.21; H, 9.62. Found: C, 80.47; H, 9.62 (cis), C, 80.40; H, 9.82 (trans).

Example 3.—6a,7,8,10a-tetrahydro-1-hydroxy-6,6,9-trimethyl-3-pentyl-6H-dibenzo[b,d]pyran When the process of Example 2 is carried out using, instead of boron trifluoride etherate in benzene, 0.0005 N hydrochloric acid in ethanol, the products obtained following elution from the Florisil column are the racemic mixtures of the cis and trans forms of the title $\Delta^{9,10}$ product.

Example 4

When the following resorcinol starting materials are substituted for 5-(1,2-dimethylheptyl)resorcinol in Example 1, and the procedure carried out as described therein, the cis and trans forms of the following products are obtained:

Starting material: resorcinol. Product: 6a,7,10-10a-tetrahydro - 1 - hydroxy - 6,6,9-trimethyl-6H-dibenzo[b,d]pyran.

Starting material: 5-methylresorcinol. Product: 6a,7,10,10a - tetrahydro - 1 - hydroxy-3,6,6,9-tetramethyl-6H-dibenzo[b,d]pyran.

Starting material: 5-sec-butylresorcinol. Product: 3-sec-butyl - 6a,7,10,10a - tetrahydro - 1 - hydroxy-6,6,9-trimethyl-6H-dibenzo[b,d]pyran.

Starting material: 5-heptylresorcinol. Product: 3-heptyl-6a,7,10,10a - tetrahydro - 1 - hydroxy-6,6,9-trimethyl-6H-dibenzo[b,d]pyran.

Starting material: 5-(1,2-dimethylhexyl)resorcinol. Product: 3 - (1,2 - dimethylhexyl)-6a,7,10,10a-tetrahydro-1-hydroxy-6,6,9-trimethyl-6H-dibenzo[b,d]pyran.

Starting material: 5-(1-methylnonyl)resorcinol. Product: 6a,7,10,10a - tetrahydro - 1 - hydroxy-6,6,9-trimethyl-3-(1-methylnonyl)-6H-dibenzo[b,d]pyran.

Example 5

When the following resorcinol starting materials are substituted for 5-pentylresorcinol in Example 3, and the procedure carried out as described therein, the cis and trans forms of the following products are obtained.

Starting material: 5-ethylresorcinol. Product: 3-ethyl-6a,7,8,10a - tetrahydro - 1 - hydroxy-6,6,9-trimethyl-6H-dibenzo[b,d]pyran.

Starting material: 5-(1,1-dimethylbutyl)resorcinol. Product: 3 - (1,1 - dimethylbutyl)-6a,7,8,10a-tetrahydro-1-hydroxy-6,6,9-trimethyl-6H-dibenzo[b,d]pyran.

Starting material: 5-(1-methylhexyl)resorcinol. Product: 6a,7,8,10a - tetrahydro - 1 - hydroxy-6,6,9-trimethyl-3-(1-methylhexyl)-6H-dibenzo[b,d]pyran.

Starting material: 5-(1-methyloctyl)resorcinol. Product: 6a,7,8,10a - tetrahydro - 1 - hydroxy-6,6,9-trimethyl-3-(1-methyloctyl)-6H-dibenzo[b,d]pyran.

We claim:
1. A process for preparing a 6a,10a-cis compound of the formula

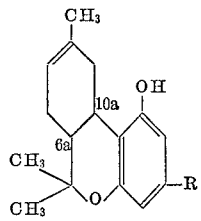

and the 6a,10a-trans isomer thereof, where R is hydrogen or alkyl of up to 12 carbon atoms, comprising condensing citral with a 5-R-resorcinol in the presence of a strong acid in a solvent.

2. A process as claimed in claim 1, in which the strong acid is a Lewis acid.

3. A process as claimed in claim 2, in which the Lewis acid is boron trifluoride etherate.

4. A process as claimed in claim 3, in which the solvent is benzene or ethyl acetate.

5. A process as claimed in claim 1, in which R is pentyl, or 1,2-dimethylheptyl.

6. A process as claimed in claim 5, in which the strong acid is boron trifluoride etherate and the solvent is benzene or ethyl acetate.

7. A process for preparing a 6a,10a-cis compound of the formula

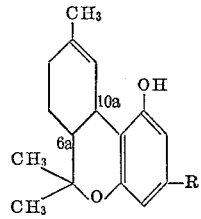

and the 6a,10a-trans isomer thereof, where R is hydrogen or alkyl of up to 12 carbon atoms, comprising condensing citral with a 5-R-resorcinol in the presence of a mild acid in a solvent at a temperature of 0° to 30°.

8. A process as claimed in claim 7, in which the mild acid is dil. hydrochloric acid and the solvent is ethanol.

9. A process as claimed in claim 8, in which R is pentyl.

10. A 6a,10a-cis compound of the formula

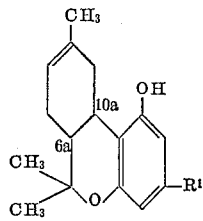

or a 6a,10a-trans isomer thereof, where $R^1$ is alkyl of 7 to 12 carbon atoms.

11. A compound as claimed in claim 10, in which $R^1$ is 1,2-dimethylheptyl.

12. The trans isomer of the compound of claim 11.

13. A 6a,10a-cis compound of the formula

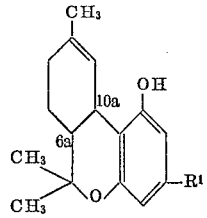

or a 6a,10a-trans isomer thereof, where $R^1$ is alkyl of 7 to 12 carbon atoms.

14. A compound as claimed in claim 13, in which $R^1$ is 1,2-dimethylheptyl.

15. The trans isomer of the compound of claim 14.

References Cited
UNITED STATES PATENTS

| | | | |
|---|---|---|---|
| 2,419,934 | 5/1947 | Adams | 260—345.3 XR |
| 2,419,936 | 5/1947 | Adams | 360—345.3 XR |

JOHN D. RANDOLPH, *Primary Examiner.*

J. M. FORD, *Assistant Examiner.*